(12) United States Patent
Boyd et al.

(10) Patent No.: US 7,603,581 B2
(45) Date of Patent: Oct. 13, 2009

(54) REMOTE COPYING OF UPDATES TO PRIMARY AND SECONDARY STORAGE LOCATIONS SUBJECT TO A COPY RELATIONSHIP

(75) Inventors: Kenneth Wayne Boyd, Tucson, AZ (US); Lisa Joan Gundy, Tucson, AZ (US); Nils Torbjorn Kaving, Huddinge (SE); Robert Frederic Kern, Otter Rock, OR (US); Gregory Edward McBride, Vail, AZ (US); Alan George McClure, Sahuarita, AZ (US); William Frank Micka, Tucson, AZ (US); David B. Petersen, Great Falls, VA (US); Gail Andrea Spear, Tucson, AZ (US); Warren Keith Stanley, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 11/384,798

(22) Filed: Mar. 17, 2006

(65) Prior Publication Data
US 2007/0220223 A1 Sep. 20, 2007

(51) Int. Cl.
G06F 11/00 (2006.01)
(52) U.S. Cl. .................... 714/6; 714/13; 714/18
(58) Field of Classification Search .............. 714/6, 714/13, 18
See application file for complete search history.

(56) References Cited

U.S. PATENT DOCUMENTS

| 6,374,327 | B2 | 4/2002 | Sakaki et al. | |
|---|---|---|---|---|
| 6,446,175 | B1 | 9/2002 | West et al. | |
| 6,907,507 | B1 * | 6/2005 | Kiselev et al. | 711/162 |
| 6,922,763 | B2 * | 7/2005 | Suzuki et al. | 711/162 |
| 7,130,975 | B2 * | 10/2006 | Suishu et al. | 711/162 |
| 7,165,141 | B2 * | 1/2007 | Cochran et al. | 711/114 |
| 7,167,963 | B2 * | 1/2007 | Hirakawa et al. | 711/162 |
| 7,266,665 | B2 | 9/2007 | Stanley et al. | |
| 2003/0051111 | A1 * | 3/2003 | Nakano et al. | 711/162 |

(Continued)

OTHER PUBLICATIONS

Prior art cited by China Patent Office dated Sep. 19, 2008.

*Primary Examiner*—Robert Beausoliel
*Assistant Examiner*—Charles Ehne
(74) *Attorney, Agent, or Firm*—David W. Victor; Konrad Raynes & Victor LLP (57) ABSTRACT

Provided are a method, system, and program for remote copying of updates to primary and secondary storage locations subject to a copy relationship. A first copy relationship is established between first and second storage locations in a first storage system and second storage system, respectively, wherein updates to the first storage locations are copied to the second storage locations. A second copy relationship is established between the first storage locations in the first copy relationship and third storage locations in a third storage system, wherein updates to the first storage locations are indicated in a first bitmap. A suspended third copy relationship is established between the second storage locations in the first copy relationship and the third storage locations, wherein updates to the second storage locations are indicated in a second bitmap. Updates are copied from the first or second storage locations to the third storage locations, wherein the first or second bitmap is capable of being used to determine updates for the first or second storage locations to copy to the third storage locations.

27 Claims, 6 Drawing Sheets

U.S. PATENT DOCUMENTS

| | | | |
|---|---|---|---|
| 2003/0177321 A1* | 9/2003 | Watanabe | 711/161 |
| 2003/0177322 A1 | 9/2003 | Crockett et al. | |
| 2004/0034808 A1* | 2/2004 | Day et al. | 714/6 |
| 2004/0148443 A1* | 7/2004 | Achiwa | 710/36 |
| 2004/0225914 A1 | 11/2004 | Burton et al. | |
| 2004/0230756 A1* | 11/2004 | Achiwa et al. | 711/162 |
| 2004/0260736 A1 | 12/2004 | Kern et al. | |
| 2004/0260899 A1 | 12/2004 | Kern et al. | |
| 2005/0038968 A1* | 2/2005 | Iwamura et al. | 711/162 |
| 2005/0071708 A1 | 3/2005 | Bartfai et al. | |
| 2005/0071710 A1 | 3/2005 | Micka et al. | |
| 2005/0081091 A1* | 4/2005 | Bartfai et al. | 714/6 |
| 2005/0097391 A1 | 5/2005 | Boyd et al. | |
| 2005/0154849 A1 | 7/2005 | Watannabe | |
| 2005/0223267 A1* | 10/2005 | Fujibayashi | 714/6 |
| 2005/0251633 A1* | 11/2005 | Micka et al. | 711/162 |
| 2006/0085609 A1* | 4/2006 | Ninose et al. | 711/162 |
| 2006/0179170 A1* | 8/2006 | Kodama | 710/8 |

* cited by examiner

REMOTE COPYING OF UPDATES TO PRIMARY AND SECONDARY STORAGE LOCATIONS SUBJECT TO A COPY RELATIONSHIP

BACKGROUND OF THE INVENTION

1. Field of the Invention

The present invention relates to a method, system, and program for the remote copying of updates to primary and secondary storage locations subject to a copy relationship.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy. These different copy technologies are described in the IBM publications "The IBM TotalStorage DS6000 Series: Copy Services in Open Environments", IBM document no. SG24-6783-00 (September 2005) and "IBM TotalStorage Enterprise Storage Server: Implementing ESS Copy Services with IBM eServer zSeries", IBM document no. SG24-5680-04 (July 2004).

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices. In certain backup systems, a sysplex timer is used to provide a uniform time across systems so that updates written by different applications to different primary storage devices use consistent time-of-day (TOD) values as time stamps. Application systems time stamp data sets when writing such data sets to volumes in the primary storage. The integrity of data updates is related to ensuring that updates are done at the secondary volumes in the volume pair in the same order as they were done on the primary volumes. The time stamp provided by the application program determines the logical sequence of data updates.

In many application programs, such as database systems, certain writes cannot occur unless a previous write occurred; otherwise the data integrity would be jeopardized. Such a data write whose integrity is dependent on the occurrence of previous data writes is known as a dependent write. Volumes in the primary and secondary storages are consistent when all writes have been transferred in their logical order, i.e., all dependent writes transferred first before the writes dependent thereon. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent.

Consistency groups are formed within a session. All volume pairs assigned to a session will have their updates maintained in the same consistency group. Thus, the sessions are used to determine the volumes that will be grouped together in a consistency group. Consistency groups are formed within a journal device or volume. From the journal, updates gathered to form a consistency group are applied to the secondary volume. If the system fails while updates from the journal are being applied to a secondary volume, during recovery operations, the updates that did not complete writing to the secondary volume can be recovered from the journal and applied to the secondary volume.

A customer may want updates to a primary storage that are mirrored at a secondary storage to also be copied to a further remote storage as part of a remote copy session between the primary storage and remote storage. If a switchover or swap occurs from the primary storage to the secondary storage, then a new remote copy session must be established to copy the updates now being received at the secondary storage system to the remote storage system. Further, in current systems, if the remote session between the failed primary storage system and the remote site was asynchronous, a full copy of all data at the secondary storage site is made to the remote site if as a result of the failure some data was left in the failing primary storage system cache.

For these reasons there is a need in the art for improved techniques for handling failures in a mirrored environment.

SUMMARY

Provided are a method, system, and program for remote copying of updates to primary and secondary storage locations subject to a copy relationship. A first copy relationship is established between first and second storage locations in a first storage system and second storage system, respectively, wherein updates to the first storage locations are copied to the second storage locations. A second copy relationship is established between the first storage locations in the first copy relationship and third storage locations in a third storage system, wherein updates to the first storage locations are indicated in a first bitmap. A suspended third copy relationship is established between the second storage locations in the first copy relationship and the third storage locations, wherein updates to the second storage locations are indicated in a second bitmap. Updates are copied from the first or second storage locations to the third storage locations, wherein the first or second bitmap is capable of being used to determine updates for the first or second storage locations to copy to the third storage locations. The article of manufacture of claim 1, wherein the suspended third copy relationship between the second storage locations and the third storage locations is created in response to creating the second copy relationship between the first storage locations and the third storage locations, and wherein updates to the second storage locations are not copied to the third storage locations while the third copy relationship is suspended.

In a further embodiment, a first session for the second copy relationship and a second session for the third copy relationship are managed as one logical session.

In a further embodiment, a toggle command is provided to the first storage system to clear the first bitmap in response to transferring the updates indicated in the first bitmap from the first storage locations to the third storage locations according to the second copy relationship. The toggle command is propagated to the second storage system in response to receiving the toggle command to clear the second bitmap for the suspended third copy relationship.

In a further embodiment, a flag is set on the toggle command provided to the first storage system instructing the first storage system to propagate the toggle command to the second storage system.

In a further embodiment, a switch operation is performed to cause updates to be received at the second storage system, wherein updates to the second storage system are indicated in the second bitmap. The suspended third copy relationship is indicated as active and the second copy relationship is indicated as suspended. Updates indicated in the second bitmap are copied from the second storage locations to the third storage locations in response to indicating that the suspended third copy relationship is active.

In a further embodiment, a failure is detected at the first storage system, wherein the failure causes the switch operations to be performed. The second copy relationship is suspended to suspend the copying of updates from the first storage locations to the second storage locations in response to detecting the failure.

In a further embodiment, the first storage system performs the switch to cause updates to be received at the second storage locations. The second storage system communicates to a data mover system information indicating that the second copy relationship is suspended. The data mover system indicates that the third copy relationship is active and copies the updates indicated in the second bitmap from the second storage locations to the third storage locations in response to indicating that the third copy relationship is active.

In a further embodiment, the switch operations comprise first switch operations. Second switch operations are performed in response to determining that the first storage system is recovered. Updates indicated in the second bitmap are copied from the second storage locations to the third storage locations in response to performing the second switch operations. The active third copy relationship is indicated as suspended and the second copy relationship is indicated as active. Updates are received at the first storage locations and then copied from the first storage locations to the second storage locations according to the first copy relationship In a further embodiment, a command to add first storage and second storage locations to the first copy relationship is received, wherein updates to the added first storage locations are copied to the added second storage locations. The added first storage locations and corresponding third storage locations are added to the second copy relationship, wherein updates to the added first storage locations are copied to the corresponding third storage locations when the second copy relationship is active. The added second storage locations and the corresponding third storage locations are added to the suspended third copy relationship.

In a further embodiment, a command is received to remove first storage and second storage locations from the first copy relationship, wherein updates to the removed first storage locations are not copied to the removed second storage locations. The removed first storage locations are removed from the second copy relationship in response to the remove command, wherein updates to the removed first storage locations are not copied to the third storage locations. The removed second storage locations are removed from the suspended third copy relationship in response to the remove command.

DETAILED DESCRIPTION

Figure 1:
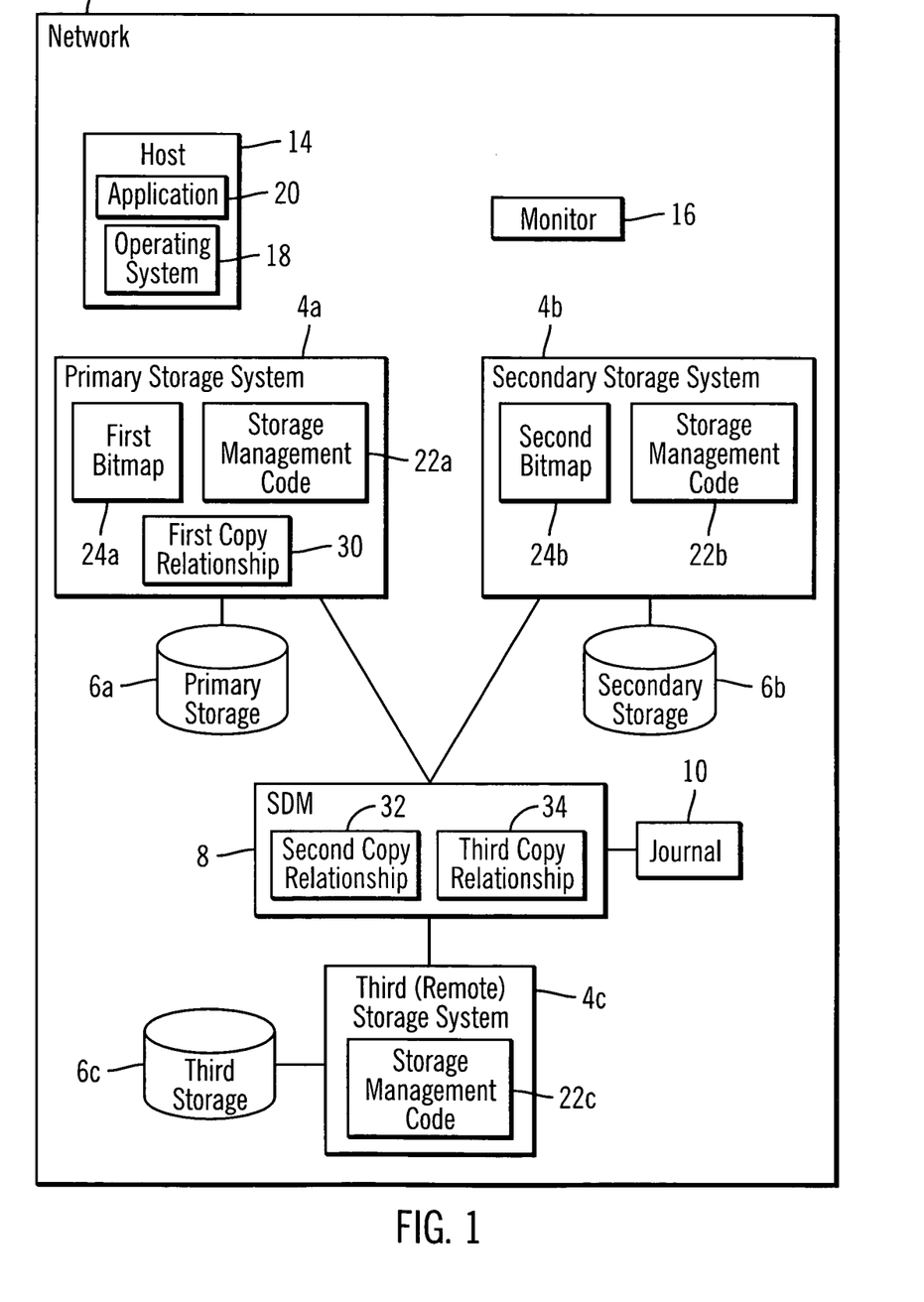
FIG. 1 illustrates an embodiment of a network computing environment.

FIG. 1 illustrates an embodiment of a network computing environment. A network 2 includes storage systems 4a, 4b, 4c (also known as control units or storage controllers); storages 6a, 6b, 6c; a system data mover (SDM) 8 managing the copying of updates from the primary storage system 4a to the third storage system 4c; a host 14 writing updates to the primary 6a or secondary storage 6b; and a monitor program 16 monitoring failures in the availability of the primary storage system 4a. The components 4a, 4b, 4c, 6a, 6b, 6c, 8, 10, 14, and 16 are connected to the network 2 and the network 2 enables communication among these components. The network 2 may include one or more switches to provide one or more paths of communication between the different network 2 elements. As shown in FIG. 1, the monitor 16 may be implemented in a system, such as a host, that is external to other systems. Alternatively, the monitor 16 may be implemented in one of the systems 4a, 4b, 4c, 8.

A first copy relationship 30, which may be maintained at the primary 4a and secondary 4b storage systems, associates primary storage locations in the primary storage 6a and corresponding secondary storage locations in the secondary storage 6b, such that updates to the primary storage 6a locations are copied to the corresponding secondary storage 6b locations. The updates to the primary storage 6a locations may be copied to the corresponding secondary storage 6b locations before they are written to the primary storage 6a. A second copy relationship 32 associates primary storage locations and corresponding third storage locations in the third storage 6c and a third copy relationship 34 associates secondary storage locations, corresponding to primary storage locations, and third storage locations in the third storage 6c. Primary and associated secondary storage locations are associated by the second 32 and third 34 copy relationships to the same corresponding third storage locations, such that an update to either a primary or associated secondary storage location according to the first copy relationship is copied to the same corresponding third storage location. In one embodiment the first copy relationship 30 comprises a peer-to-peer copy relationship, where the primary and secondary storages 6a, 6b are in proximate locations and the second 32 and third 34 copy relationships comprises remote copy relationships where the third storage 6c may be a considerable distance, e.g., a thousand or more miles, from the primary and secondary storages 6a, 6b. Information on the second 32 and third 34 copy relationships may be maintained by the SDM 8. The first 30, second 32, and third 34 copy relationships may comprise multiple copy relationships, one for one or more storage location pairs (e.g., a primary and secondary storage location pair, a primary and third storage location pair, and a secondary and third storage location pair). Alternatively, the relationships between the pairs may be maintained by a single copy relationship.

The host 14 includes an operating system 18 and an application 20 that writes updates to the primary 6a or secondary 6b storage. The primary 4a and secondary 4b storage systems include storage management software 22a and 22b to manage the data mirroring operations. Updates to the primary 6a and secondary 6b storages are indicated in a first 24a and second 24b bitmaps, respectively. The bitmaps 24a and 24b are cleared when the SDM 8 copies updates indicated in the bitmaps 24a or 24b to the corresponding third storage locations in the third storage 4c. The third storage system 4c includes storage management code 22c to perform storage management relations with respect to the updates received from the primary 4a or secondary 4b storage systems.

The system data mover (SDM) program 8 accesses updates to the primary (first) 6a or secondary (second) 6b storages and forms a consistency group of updates to the primary 6a or secondary 6b storage to write to the corresponding third storage locations in the third storage 6c. At the primary 4a and secondary 4b storage systems, updates may be written to a side file in a cache. The updates may then be transferred to a journal 10 maintained by the SDMs 8. Within the journal 10, the updates are arranged into consistency groups. The journal 10 may store one or more consistency groups. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent.

Consistency groups are formed within a session. A session may comprise the operations of volume pairs managed by the SDM 8. In the described embodiments, a session comprises primary storage locations (e.g., volumes) in the primary storage 6a or secondary storage locations (e.g., volumes) in the secondary storage 6b and the corresponding third storage locations in the third storage 6c. The sessions for the second 32 and third copy relationships 34 of volume pairs between the primary storage locations and the third storage locations and the volume pairs between the secondary storage locations and third storage locations (where the primary and secondary storage locations correspond to the first copy relationship), may be managed as a single logical session. All volume pairs assigned to a session will have their updates maintained in the same consistency group. Thus, the sessions are used to determine the volumes that will be grouped together in a consistency group. If the system fails while updates (to the primary 6a or secondary 6b storage) from the journal 10 are being applied to the third storage 6c, during recovery operations, then the updates that did not complete writing to the third storage 6c can be recovered from the journal 10 and applied to the third storage 6c.

The SDM 8 may comprise a program implemented in a host system, which may be at the site of the third storage system 4c or the sites of the first 4a and second 4b storage systems.

The monitor program 16 may monitor the primary storage system 4a and upon detecting a failure event may cause a swap operation to have updates from the host 14 sent to the secondary storage system 4b.

The storage systems 4a, 4b, 4c may comprise enterprise storage servers, such as the IBM Enterprise Storage Server (ESS). The storage management code 22a, 22b managing the first copy relationship 30 may be implemented using synchronous copy operations, such as a peer-to-peer remote copy (PPRC) program. An example of a PPRC program is the IBM Geographically Dispersed Parallel Sysplex (GDPS)/PPRC copy program that enables the switching of updates to the primary storage 6a to the secondary storage 6b. The SDM 8 and storage management code 22a, 22b, and 22c may implement asynchronous remote copy operations. An example of an asynchronous remote copy program is the IBM GDPS/XRC program where updates to the primary 6a or secondary 6b storage are mirrored to a corresponding location in the third storage 6c. The described operations may be implemented with other global recovery programs.

The network 2 may comprise a Storage Area Network (SAN), Local Area Network (LAN), Intranet, the Internet, Wide Area Network (WAN), peer-to-peer network, wireless network, arbitrated loop network, etc. The storages 6a, 6b, 6c may comprise an array of storage devices, such as a Just a Bunch of Disks (JBOD), Direct Access Storage Device (DASD), Redundant Array of Independent Disks (RAID) array, virtualization device, tape storage, flash memory, etc.

Figure 2:
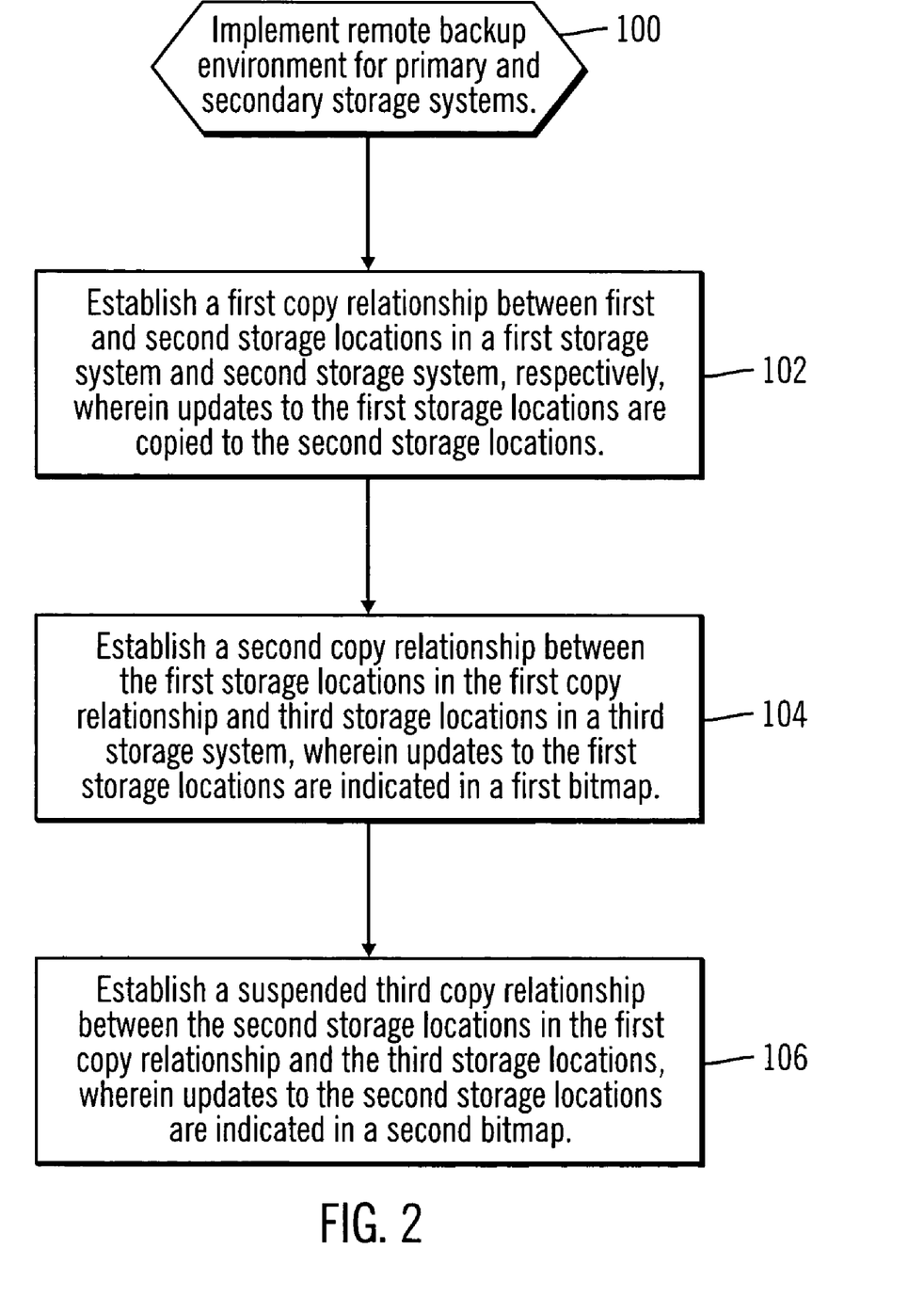
FIG. 2 illustrates an embodiment of operations to establish copy relationships between a primary and secondary storage locations and third storage locations.

FIG. 2 illustrates operations initiated (at block 100) by a user to implement a remote backup copy environment for the primary and secondary storage systems. The storage management code 22a, 22b is invoked to establish (at block 102) a first copy relationship 30 between first and second storage locations in a first storage system and second storage system, respectively. Updates to the first storage locations are copied to the second storage locations as part of a first type of copy operation, such as a synchronous copy operation. A second copy relationship 32 is established (at block 104) between the first storage 6a locations in the first copy relationship 30 and third storage 6c locations in a third storage system. Updates to the first storage locations are indicated in the first bitmap 24a. A suspended third copy relationship 34 is established (at block 106) between the second storage 6b locations in the first copy relationship 30 and the third storage 6c locations. Updates to the second storage 6c locations are indicated in the second bitmap 24b. The operations at blocks 104 and 106 may be performed by storage management code 22a, 22b or SDM 8 code used to implement the asynchronous remote copy operation. In one embodiment, the second 32 and third 34 copy relationships may be automatically created in response to creating a first copy relationship 30 between the primary and secondary storage locations.

Figure 3:
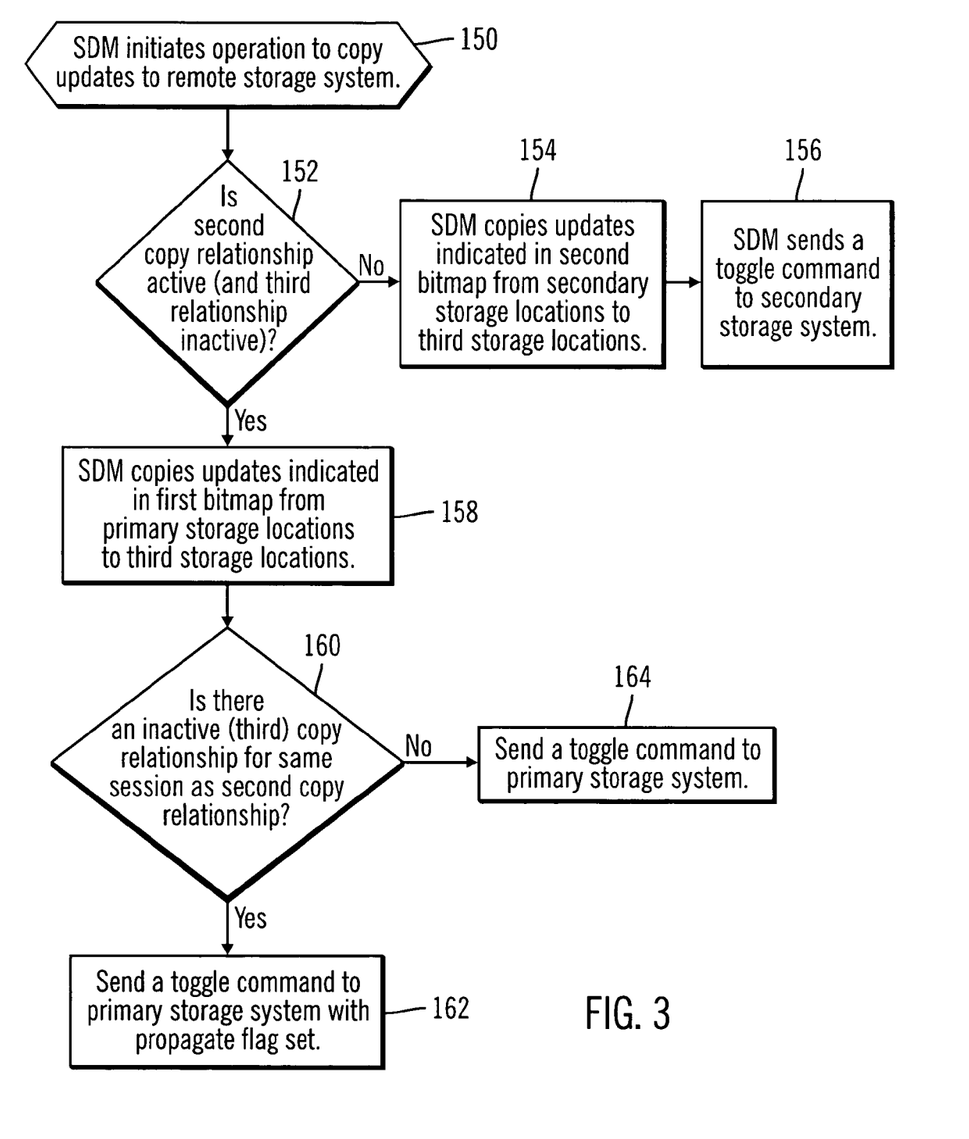
FIG. 3 illustrates an embodiment of operations to copy updates from the primary or secondary storage locations to the third storage locations.

FIG. 3 illustrates an embodiment of operations which may be performed by the SDM 8 when copying updates to the primary 6a or secondary 6b storage to the third storage 6c. The operations of FIG. 3 may be performed once the updates are buffered in the journal 10 or actually copied to the third storage system 4c. The updates to the primary 6a or secondary 6b storage that are copied to the third storage 6c may be maintained in cache and later destaged to the third storage 6c. In response to initiating (at block 150) the remote copy operations, the SDM 8 determines (at block 152) whether the second copy relationship 32 is active, which means the third copy relationship 34 is suspended. If (at block 152) the second copy relationship 32 (between the primary storage 6a and third storage 6c) is inactive and the third copy relationship 34 (between the secondary storage 6b and the third storage 6c) is active, then the SDM 8 copies (at block 154) the updates indicated in second bitmap 24b from secondary storage locations 6b to third storage locations. 6c. The SDM 8 further sends (at block 156) a toggle command to the secondary storage system 4b to clear the second update bitmap 24b indicating updates. If (at block 152) the second copy relationship is active, then the SDM 8 copies (at block 158) updates to the primary storage locations indicated in the first bitmap 24a to the corresponding third storage locations according to the second copy relationship. If (at block 160) there is an inactive (third) copy relationship 34 for the same session as the second copy relationship 32, then the SDM 8 sends (at block 162) a toggle command to the primary storage system 4a with a propagate flag set to cause the primary storage system 4a to forward the toggle command to the secondary storage system 4b to clear the second bitmap 24b for the suspended session. Otherwise, if (at block 160) there is no third suspended copy 34 relationship for the same session as the active second copy relationship 32, then the SDM sends (at block 164) a toggle command to the primary storage system 4a without the propagate flag set.

In one embodiment, there are two bitmaps for each volume in the storages 6a and 6b, the "n" and "n–1" bitmaps. As updates are made from the host 14 to the primary storage 6a volumes, a bit is set to one for the modified track location in the "n" bitmap. As that same update is sent to a corresponding secondary storage 6b volume as part of the first copy relationship 30, a bit is set to "one" in the secondary storage system volume "n" bitmap such as performed for the primary storage 6a volume. The SDM 8 sends a toggle command as part of the second copy relationship 32 for the primary storage 6a volumes (assuming there has been no failure yet). This toggle command causes the primary storage 6a volume "n" bitmap to transfer its contents to the "n–1" bitmap and then clear the "n" bitmap. If the propagate flag is set, then the primary storage system 4a sends the toggle command to the secondary storage system 4b to perform the same toggle function. This dual bitmap design for each volume is used in an embodiment where the second copy relationship 32 is an asynchronous copy operation and there may be updates in the primary storage system 4a cache which have not been journaled yet but are noted in the bitmaps. This information in the "n–1" bitmap will be used during the failover to send data from the secondary storage 4b volume to the third storage 4c volume that has previously been updated but has not been transferred by the SDM 8 to the journal 10

Figure 4:
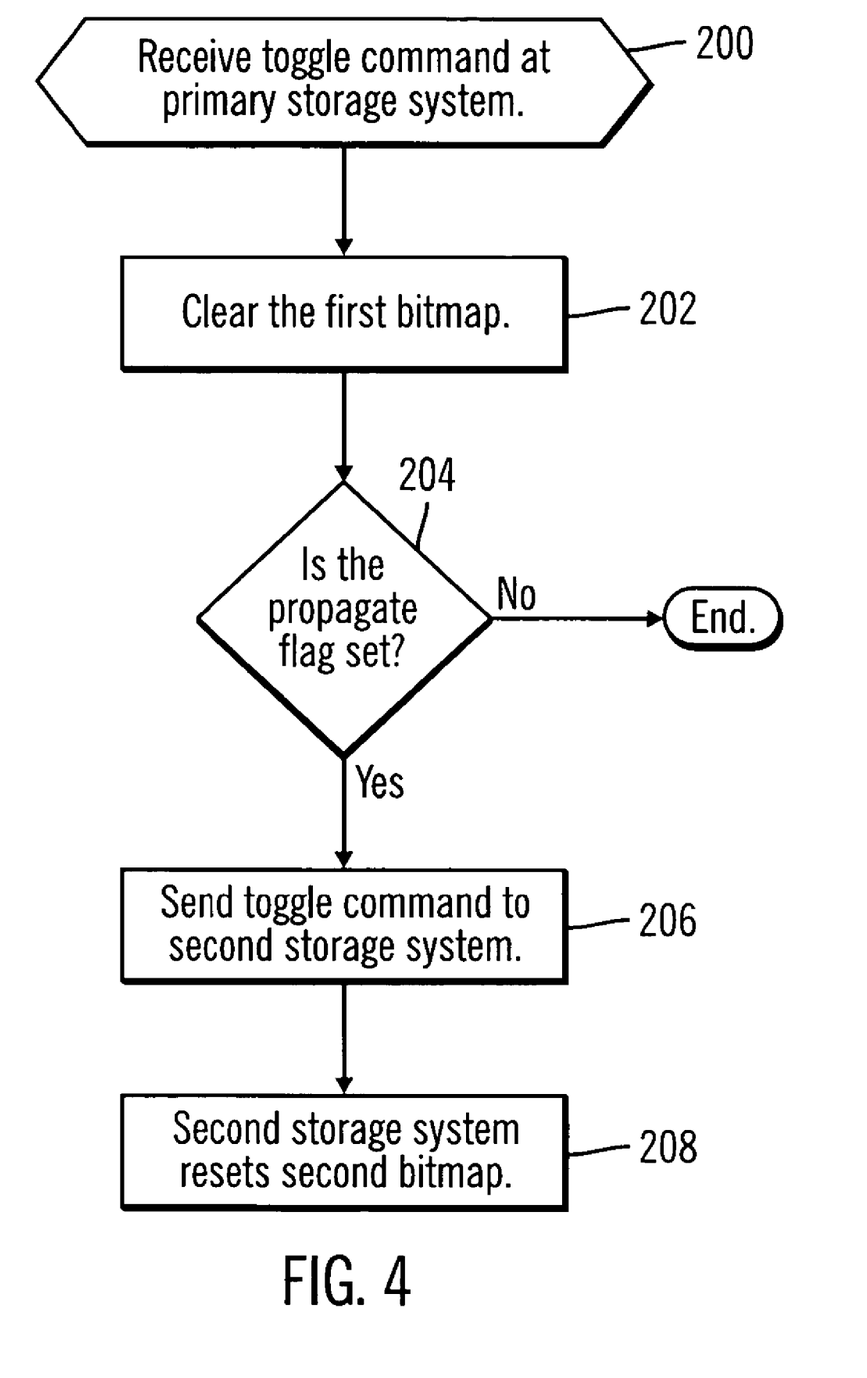
FIG. 4 illustrates an embodiment of operations to process a toggle command at the primary storage system.

FIG. 4 illustrates an embodiment of operations performed by the primary and secondary storage management code 22a and 22b, respectively, to process a toggle command from the SDM 8. Upon the storage management code 22a receiving (at block 200) a toggle command at the primary storage system 4a, the storage management code 22a clears (at block 202) the first bitmap 24a. If (at block 204) the storage management code 22a determines that a propagate flag in the received toggle command is set, then the storage management code 22a sends (at block 206) the toggle command to the second storage system 4b; otherwise, control ends. In response to receiving the toggle command, the second storage system 4b clears the second update bitmap 24b.

In embodiments where there are two bitmaps for each volume, e.g., the "n" and "n–1" bitmaps, then updates indicated in the "n–1" bitmap that have not been journaled in the journal 10 by the SDM 8 are copied to the third storage 6c from the secondary storage 4b. Further, with this embodiment, the third copy relationship becomes fully operational, i.e., duplex, by only copying the data that is out of synchronization between the second and third storages, which is the data represented by the "n" and "n–1" bitmaps for the secondary storage 6b.

Figure 5:
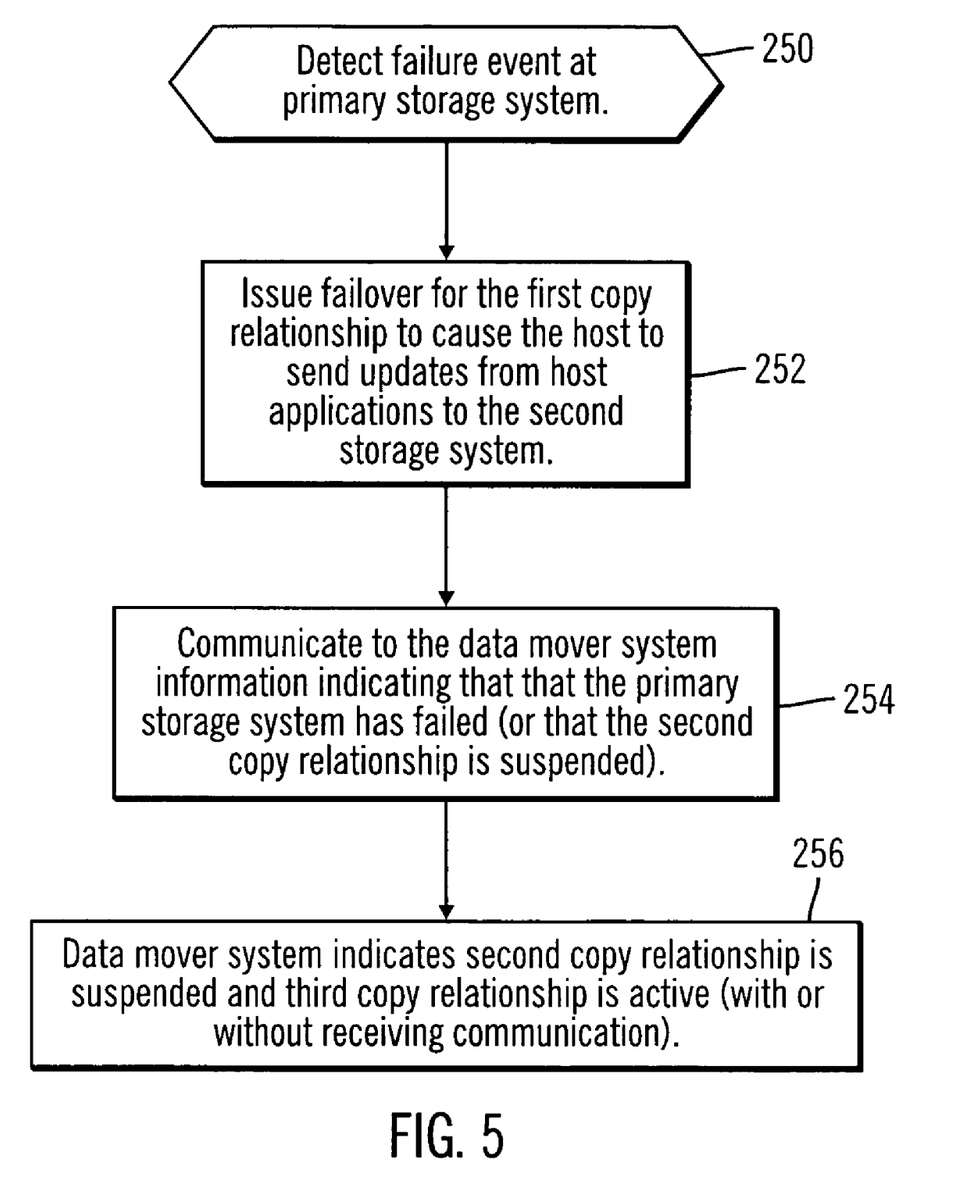
FIG. 5 illustrates an embodiment of operations to switch over to sending updates to the secondary storage system in response to a failure at the primary storage system.

FIG. 5 illustrates an embodiment of operations to handle an error event at the primary storage system 4a requiring swapping to the secondary storage system 4b. The error event may comprise a failure of the primary storage system 4a or a failure in the network 2 connection at the primary storage system 4a. A failure at the primary storage system 4a is detected (at block 250). The failure may be detected by the monitor component 16 or be detected by the SDM 8. Upon detecting the failure, a failover is issued (at block 252) for the first copy relationship 30 (or some other action performed) to cause the host 20 to write further updates to the secondary storage 6b instead of primary storage 6a. The monitor code 16 may communicate (at block 254) to the SDM 8 that the primary storage system 4a has failed or that second copy relationship 32 is suspended. Alternatively, the SDM 8 may learn of the failure of the primary storage system 4a (or suspension of the second copy relationship 32) before receiving indication from the monitor code 16 of such failure. The SDM 8 indicates (at block 256) the second copy relationship 32 as suspended and the third copy relationship 34 as active in response to determining that the first storage system 4a has a failure (either independently of the communication from the monitor 16 or in response to the communication).

Figure 6:
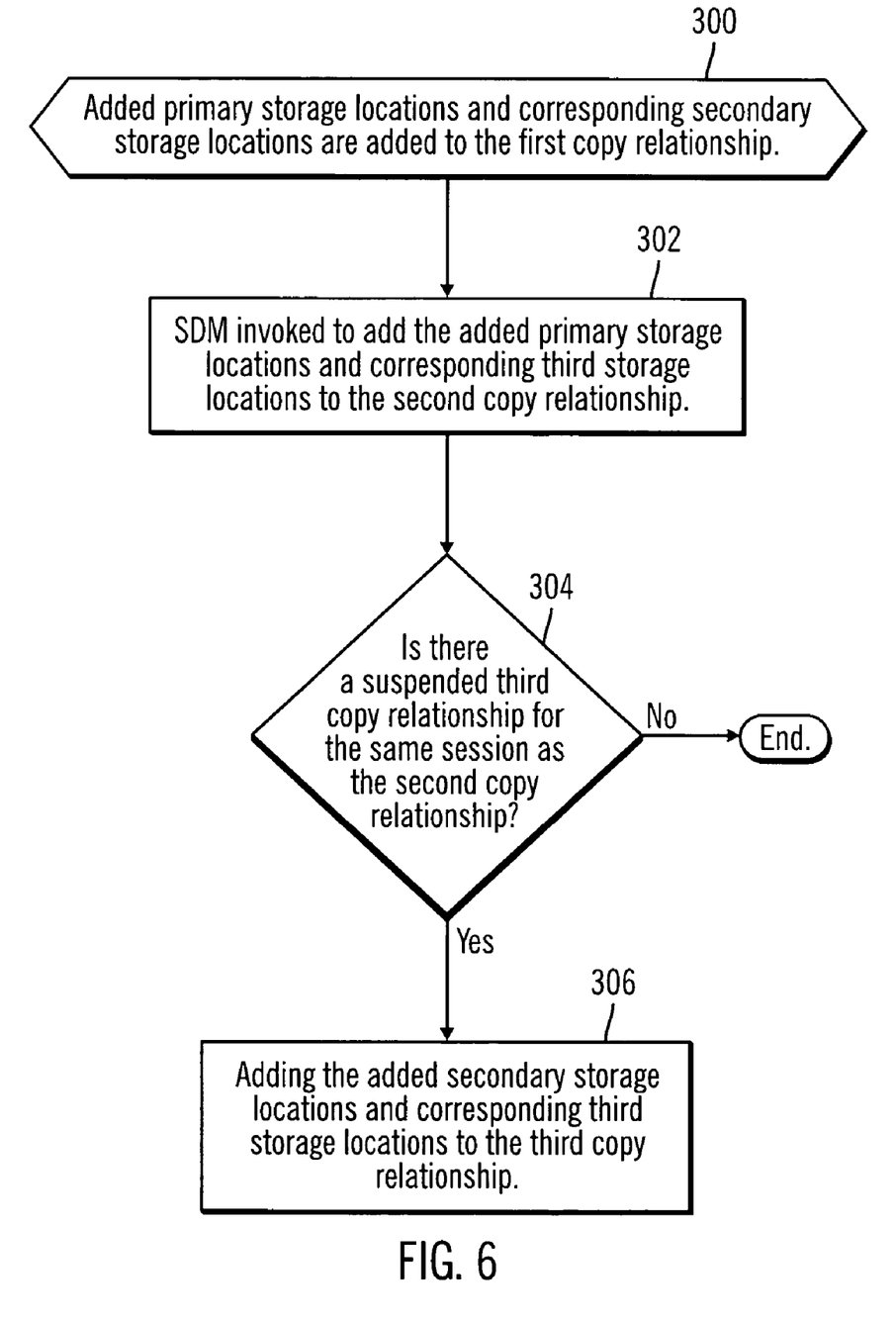
FIG. 6 illustrates an embodiment of operations to add primary and corresponding secondary storage locations to a copy relationship between the primary and secondary storages.

FIG. 6 illustrates an embodiment of operations to add storage locations (e.g., volumes) added to the first copy relationship 30 between the primary and secondary storage locations to the second 32 and third copy 34 relationships. The operations of FIG. 6 may be performed automatically by the SDM 8 in response to receiving indication of the storage locations pairs being added to the first copy relationship or may be performed in response to user invocation. In response to a user or the storage management code 22a, 22b adding (at block 300) added primary storage locations and corresponding secondary storage locations to the first copy relationship 30, the SDM 8 is invoked (at block 302) (either automatically or by user invocation) to add the added primary storage locations and corresponding third storage locations to the second copy relationship 32. If (at block 304) there is a suspended third copy relationship for the same session as the second copy relationship 32, then the SDM 8 adds (at block 306) the added secondary storage locations and corresponding third storage locations to the suspended third copy relationship. In this way the copy relationships between the primary 6a and secondary 6b storages mirror each other to the same corresponding third storage 6c locations. If (at block 304) there is no third copy relationship 34 between the secondary storage 6b and third storage 6c, then control ends.

The logic of FIG. 6 may apply to removing a pair of primary and secondary storage locations (e.g., volumes) from the first copy relationship 30, where the corresponding primary and secondary storage locations and corresponding third storage locations are removed from the second 32 and third 34 copy relationships.

In a further embodiment, a failback operation may be performed when the primary storage system 4a recovers. In the case of a failback, updates are copied from the secondary storage 6b to the primary storage 6a, a quiesce is issued to stop the sending of updates to the second storage 6b location, the third copy relationship 34 is suspended. Further, the first copy relationship 30 is re-activated to allow updates from the primary storage 6a to be copied to the secondary storage 6b and activate the second copy relationship 32 to enable the copying of updates to the third storage 6c.

Described embodiments provide a technique to allow a failover or switch to the secondary storage to be accompanied by a switch from having the primary storage system 4a provide updates to the third storage 6c to having the active secondary storage system 4b provide the updates to the third storage system 4c so that the third storage system 4c remains current with updates even if the primary storage system 4a fails. Further, because a suspended third copy relationship is maintained having a second update bitmap 24b maintaining a current reflection of updates, the mirroring at the third storage system may immediately occur by making the suspended third copy relationship active. In certain embodiments, the SDM 8 maintains the second and third copy relationships part of the same logical session so that the SDM 8 can readily determine the copy relationship to use when switching over from the primary storage system 4a to the secondary storage system 4b, and vice versa. Yet further, the third copy relationship may become operational, i.e., duplex, by only copying the data that is out of synchronization between the second and third storages instead of copying all the data. In this way, the toggling keeps the second bitmap 24b up-to-date so it may be used to copy only the changed data to the third storage to synchronize before the third copy relationship can be used.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 2-6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    establishing a first copy relationship between first and second storage locations in a first storage system and second storage system, respectively, wherein updates to the first storage locations are copied to the second storage locations;

establishing a second copy relationship between the first storage locations in the first copy relationship and third storage locations in a third storage system, wherein updates to the first storage locations are indicated in a first bitmap;

establishing a suspended third copy relationship between the second storage locations in the first copy relationship and the third storage locations, wherein updates to the second storage locations are indicated in a second bitmap;

copying updates from the first or second storage locations to the third storage locations, wherein the first or second bitmap is capable of being used to determine updates for the first or second storage locations to copy to the third storage locations;

providing a toggle command to the first storage system to clear the first bitmap in response to transferring the updates indicated in the first bitmap from the first storage locations to the third storage locations according to the second copy relationship;

setting a flag on the toggle command provided to the first storage system instructing the first storage system to propagate the toggle command to the second storage system; and propagating the toggle command to the second storage system in response to receiving the toggle command to clear the second bitmap for the suspended third copy relationship.

2. The method of claim 1, wherein the suspended third copy relationship between the second storage locations and the third storage locations is created in response to creating the second copy relationship between the first storage locations and the third storage locations, and wherein updates to the second storage locations are not copied to the third storage locations while the third copy relationship is suspended.

3. The method of claim 1, further comprising:
managing a first session for the second copy relationship and a second session for the third copy relationship as one logical session.

4. The method of claim 1, further comprising:
performing a switch operation to cause updates to be received at the second storage system, wherein updates to the second storage system are indicated in the second bitmap;

indicating the suspended third copy relationship as active and indicating the second copy relationship as suspended; and copying updates indicated in the second bitmap from the second storage locations to the third storage locations in response to indicating that the suspended third copy relationship is active.

5. The method of claim 4, further comprising:
detecting a failure at the first storage system, wherein the failure causes the switch operations to be performed; and suspending the second copy relationship to suspend the copying of updates from the first storage locations to the second storage locations in response to detecting the failure.

6. The method of claim 4, wherein the first storage system performs the switch to cause updates to be received at the second storage locations, further comprising:
communicating to a data mover system, with the second storage system, information indicating that the second copy relationship is suspended, wherein the data mover system indicates that the third copy relationship is active and copies the updates indicated in the second bitmap from the second storage locations to the third storage locations in response to indicating that the third copy relationship is active.

7. The method of claim 4, wherein the switch operations comprise first switch operations, and further comprising:
performing second switch operations in response to determining that the first storage system is recovered;

copying updates indicated in the second bitmap from the second storage locations to the third storage locations in response to performing the second switch operations; and indicating the active third copy relationship as suspended and the second copy relationship as active, wherein updates are received at the first storage locations and then copied from the first storage locations to the second storage locations according to the first copy relationship.

8. The method of claim 1, further comprising
receiving a command to add first storage and second storage locations to the first copy relationship, wherein updates to the added first storage locations are copied to the added second storage locations;

adding the added first storage locations and corresponding third storage locations to the second copy relationship, wherein updates to the added first storage locations are copied to the corresponding third storage locations when the second copy relationship is active; and adding the added second storage locations and the corresponding third storage locations to the suspended third copy relationship.

9. A method, comprising:
establishing a first copy relationship between first and second storage locations in a first storage system and second storage system, respectively, wherein updates to the first storage locations are copied to the second storage locations;

establishing a second copy relationship between the first storage locations in the first copy relationship and third storage locations in a third storage system, wherein updates to the first storage locations are indicated in a first bitmap;

establishing a suspended third copy relationship between the second storage locations in the first copy relationship and the third storage locations, wherein updates to the second storage locations are indicated in a second bitmap;

copying updates from the first or second storage locations to the third storage locations, wherein the first or second bitmap is capable of being used to determine updates for the first or second storage locations to copy to the third storage locations;

receiving a command to remove first storage and second storage locations from the first copy relationship, wherein updates to the removed first storage locations are not copied to the removed second storage locations;

removing the removed first storage locations from the second copy relationship in response to the remove command, wherein updates to the removed first storage locations are not copied to the third storage locations; and removing the removed second storage locations from the suspended third copy relationship in response to the remove command.

10. An article of manufacture comprising a computer readable storage medium including code executed to manage the copying of data among a first storage system, second storage system and third storage system in a network and to perform operations, the operations comprising:

establishing a first copy relationship between first and second storage locations in the first storage system and the second storage system, respectively, wherein updates to the first storage locations are copied to the second storage locations;

establishing a second copy relationship between the first storage locations in the first copy relationship and third storage locations in the third storage system, wherein updates to the first storage locations are indicated in a first bitmap;

establishing a suspended third copy relationship between the second storage locations in the first copy relationship and the third storage locations, wherein updates to the second storage locations are indicated in a second bitmap;

copying updates from the first or second storage locations to the third storage locations, wherein the first or second bitmap is capable of being used to determine updates for the first or second storage locations to copy to the third storage locations;

providing a toggle command to the first storage system to clear the first bitmap in response to transferring the updates indicated in the first bitmap from the first storage locations to the third storage locations according to the second copy relationship;

setting a flag on the toggle command provided to the first storage system instructing the first storage system to propagate the toggle command to the second storage system; and propagating the toggle command to the second storage system in response to receiving the toggle command to clear the second bitmap for the suspended third copy relationship.

11. The article of manufacture of claim 10, wherein the suspended third copy relationship between the second storage locations and the third storage locations is created in response to creating the second copy relationship between the first storage locations and the third storage locations, and wherein updates to the second storage locations are not copied to the third storage locations while the third copy relationship is suspended.

12. The article of manufacture of claim 10, wherein the operations further comprise:

managing a first session for the second copy relationship and a second session for the third copy relationship as one logical session.

13. The article of manufacture of claim 10, wherein the operations further comprise:

performing a switch operation to cause updates to be received at the second storage system, wherein updates to the second storage system are indicated in the second bitmap;

indicating the suspended third copy relationship as active and indicating the second copy relationship as suspended; and copying updates indicated in the second bitmap from the second storage locations to the third storage locations in response to indicating that the suspended third copy relationship is active.

14. The article of manufacture of claim 13, wherein the operations further comprise:

detecting a failure at the first storage system, wherein the failure causes the switch operations to be performed; and suspending the second copy relationship to suspend the copying of updates from the first storage locations to the second storage locations in response to detecting the failure.

15. The article of manufacture of claim 13, wherein the first storage system performs the switch to cause updates to be received at the second storage locations, wherein the operations further comprise:

communicating to a data mover system, with the second storage system, information indicating that the second copy relationship is suspended, wherein the data mover system indicates that the third copy relationship is active and copies the updates indicated in the second bitmap from the second storage locations to the third storage locations in response to indicating that the third copy relationship is active.

16. The article of manufacture of claim 13, wherein the switch operations comprise first switch operations, and wherein the operations further comprise:

performing second switch operations in response to determining that the first storage system is recovered;

copying updates indicated in the second bitmap from the second storage locations to the third storage locations in response to performing the second switch operations; and indicating the active third copy relationship as suspended and the second copy relationship as active, wherein updates are received at the first storage locations and then copied from the first storage locations to the second storage locations according to the first copy relationship.

17. The article of manufacture of claim 10, wherein the operations further comprise receiving a command to add first storage and second storage locations to the first copy relationship, wherein updates to the added first storage locations are copied to the added second storage locations;

adding the added first storage locations and corresponding third storage locations to the second copy relationship, wherein updates to the added first storage locations are copied to the corresponding third storage locations when the second copy relationship is active; and adding the added second storage locations and the corresponding third storage locations to the suspended third copy relationship.

18. An article of manufacture comprising a computer readable storage medium including code executed to manage the copying of data among a first storage system, second storage system and third storage system in a network and to perform operations, the operations comprising:

establishing a first copy relationship between first and second storage locations in the first storage system and the second storage system, respectively, wherein updates to the first storage locations are copied to the second storage locations;

establishing a second copy relationship between the first storage locations in the first copy relationship and third storage locations in the third storage system, wherein updates to the first storage locations are indicated in a first bitmap;

establishing a suspended third copy relationship between the second storage locations in the first copy relationship and the third storage locations, wherein updates to the second storage locations are indicated in a second bitmap;

copying updates from the first or second storage locations to the third storage locations, wherein the first or second bitmap is capable of being used to determine updates for the first or second storage locations to copy to the third storage locations;

receiving a command to remove first storage and second storage locations from the first copy relationship, wherein updates to the removed first storage locations are not copied to the removed second storage locations;

removing the removed first storage locations from the second copy relationship in response to the remove command, wherein updates to the removed first storage locations are not copied to the third storage locations; and removing the removed second storage locations from the suspended third copy relationship in response to the remove command.

19. A system in communication with a network, comprising:

a first storage system;
a second storage system;
a third storage system, wherein the first, second and third storage systems communicate over a network;
at least one computer readable storage medium including code executed to perform operations, the operations comprising:

establishing a first copy relationship between first and second storage locations in the first storage system and the second storage system, respectively, wherein updates to the first storage locations are copied to the second storage locations;

establishing a second copy relationship between the first storage locations in the first copy relationship and third storage locations in the third storage system, wherein updates to the first storage locations are indicated in a first bitmap;

establishing a suspended third copy relationship between the second storage locations in the first copy relationship and the third storage locations, wherein updates to the second storage locations are indicated in a second bitmap;

copying updates from the first or second storage locations to the third storage locations, wherein the first or second bitmap is capable of being used to determine updates for the first or second storage locations to copy to the third storage locations;

providing a toggle command to the first storage system to clear the first bitmap in response to transferring the updates indicated in the first bitmap from the first storage locations to the third storage locations according to the second copy relationship;

setting a flag on the toggle command provided to the first storage system instructing the first storage system to propagate the toggle command to the second storage system; and propagating the toggle command to the second storage system in response to receiving the toggle command to clear the second bitmap for the suspended third copy relationship.

20. The system of claim 19, wherein the suspended third copy relationship between the second storage locations and the third storage locations is created in response to creating the second copy relationship between the first storage locations and the third storage locations, and wherein updates to the second storage locations are not copied to the third storage locations while the third copy relationship is suspended.

21. The system of claim 19, further comprising:
managing a first session for the second copy relationship and a second session for the third copy relationship as one logical session.

22. The system of claim 19, further comprising:
performing a switch operation to cause updates to be received at the second storage system, wherein updates to the second storage system are indicated in the second bitmap;

indicating the suspended third copy relationship as active and indicating the second copy relationship as suspended; and copying updates indicated in the second bitmap from the second storage locations to the third storage locations in response to indicating that the suspended third copy relationship is active.

23. The system of claim 22, further comprising:
detecting a failure at the first storage system, wherein the failure causes the switch operations to be performed; and suspending the second copy relationship to suspend the copying of updates from the first storage locations to the second storage locations in response to detecting the failure.

24. The system of claim 22, wherein the first storage system performs the switch to cause updates to be received at the second storage locations, further comprising:

communicating to a data mover system, with the second storage system, information indicating that the second copy relationship is suspended, wherein the data mover system indicates that the third copy relationship is active and copies the updates indicated in the second bitmap from the second storage locations to the third storage locations in response to indicating that the third copy relationship is active.

25. The system of claim 22, wherein the switch operations comprise first switch operations, and further comprising:

performing second switch operations in response to determining that the first storage system is recovered;

copying updates indicated in the second bitmap from the second storage locations to the third storage locations in response to performing the second switch operations; and indicating the active third copy relationship as suspended and the second copy relationship as active, wherein updates are received at the first storage locations and then copied from the first storage locations to the second storage locations according to the first copy relationship.

26. The system of claim 19, further comprising
receiving a command to add first storage and second storage locations to the first copy relationship, wherein updates to the added first storage locations are copied to the added second storage locations;

adding the added first storage locations and corresponding third storage locations to the second copy relationship, wherein updates to the added first storage locations are copied to the corresponding third storage locations when the second copy relationship is active; and adding the added second storage locations and the corresponding third storage locations to the suspended third copy relationship.

27. A system in communication with a network, comprising:
a first storage system;
a second storage system;
a third storage system, wherein the first, second and third storage systems communicate over a network;
at least one computer readable storage medium including code executed to perform operations, the operations comprising:

establishing a first copy relationship between first and second storage locations in the first storage system and the second storage system, respectively, wherein updates to the first storage locations are copied to the second storage locations;

establishing a second copy relationship between the first storage locations in the first copy relationship and third storage locations in the third storage system, wherein updates to the first storage locations are indicated in a first bitmap;

establishing a suspended third copy relationship between the second storage locations in the first copy relationship and the third storage locations, wherein updates to the second storage locations are indicated in a second bitmap;

copying updates from the first or second storage locations to the third storage locations, wherein the first or second bitmap is capable of being used to determine updates for the first or second storage locations to copy to the third storage locations;

receiving a command to remove first storage and second storage locations from the first copy relationship, wherein updates to the removed first storage locations are not copied to the removed second storage locations;

removing the removed first storage locations from the second copy relationship in response to the remove command, wherein updates to the removed first storage locations are not copied to the third storage locations; and removing the removed second storage locations from the suspended third copy relationship in response to the remove command.

* * * * *